Blodget & Horton,
Reed Organ,

N° 6,531.  Patented June 19, 1849.

UNITED STATES PATENT OFFICE.

B. T. BLODGET AND H. B. HORTON, OF AKRON, OHIO.

REED MUSICAL INSTRUMENT.

Specification of Letters Patent No. 6,531, dated June 19, 1849.

*To all whom it may concern:*

Be it known that we, BRADBURY T. BLODGET and HENRY B. HORTON, of Akron, in the county of Summit and State of Ohio, have invented a new and useful improvement in the musical instrument known as the "Seraphina"; and we do hereby declare the following to be a full, clear, and exact description thereof, reference being had to the accompanying drawings, representing our improved musical instrument and making a part of this specification, in which—

Figure 1:
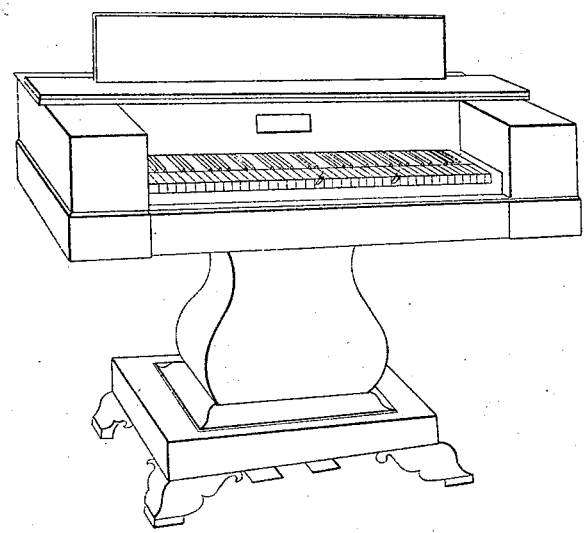
Figure 2:
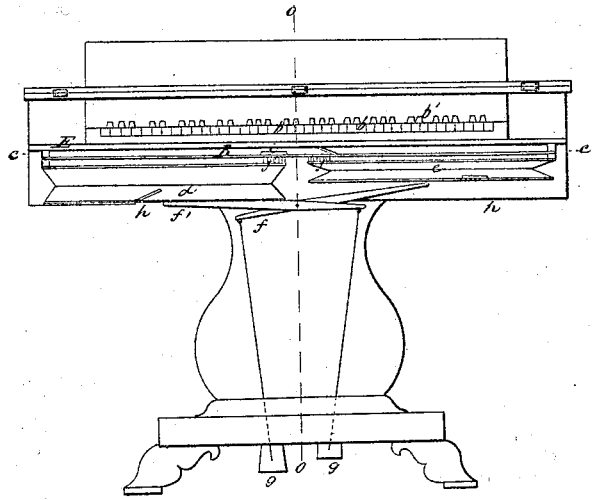
Figure 4:
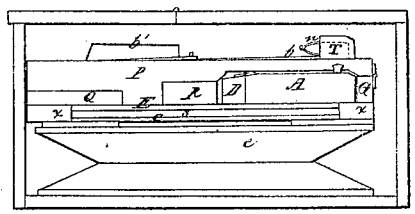
Figure 3:
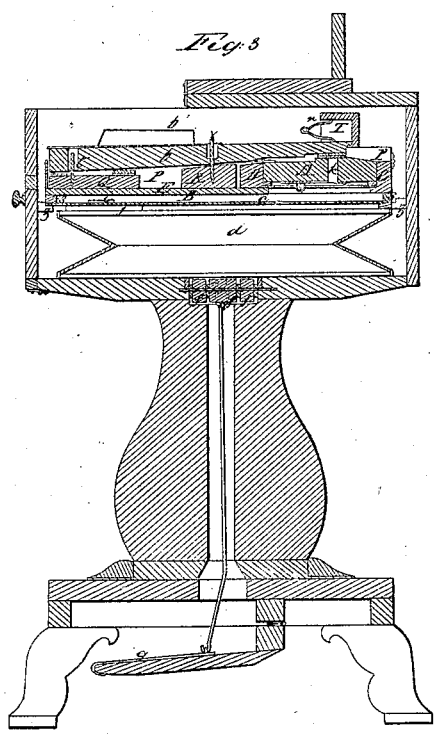

Figure 1 is a perspective view, Fig. 2 a longitudinal vertical section, Fig. 3 a transverse vertical section, in the line *o, o*, of Fig. 2, and Fig. 4 an elevation of one end of the body of the instrument, with the end of the casing removed.

Similar letters indicate like parts in all the figures.

The nature of our invention consists in converting the wind chest (B) in which the reeds (*m*) are located, into a sounding chamber by forming one side of the wind chest of a thin elastic sounding board (*c*) placed in near proximity to the reeds.

We shall designate our improved musical instrument the "melo-pean"; in its external appearance, the instrument will resemble the piano or the seraphina.

The wind chest B extends nearly or quite the entire length and breadth of the instrument, and has but little depth; in the drawings the sounding board *c* is represented as forming the under side of the wind chest, and the reeds *m* are secured to the under side of the top of the wind chest.

The top of the wind chest is composed of the nonelastic board E, and the thick block A; the sounding board *c* is confined only at its edges to the narrow bars *s, s*, descending from the edges of the top of the wind chest, by which it is permitted to vibrate freely.

Above the wind chest the series of keys *b, b*, are arranged and combined therewith, as represented in the drawings, and below the wind chest the two independent bellows *d, e*, are located and combined therewith as represented. The tops of the bellows are secured at their corners to the under side of the sounding board *c*, leaving sufficient space between them to allow the sounding board to vibrate freely. The bellows communicate with the wind chest by means of openings in the corner fastening blocks *j, j*, covered by the valves *i, i*, opening into the wind chest. The bottoms of the bellows are movable and are forced upward to discharge air from the bellows into the wind chest, by the levers *f, f*, which bear against the central portion of each; and when the levers are not operated, the bellows descend by their own weight and fill with air through the valves *h, h*, in their bottoms. Friction rollers are placed in the ends of the levers *f, f*, that bear against the under sides of the bellows, and the opposite ends of the levers are connected by rods or wires to the pedals *g, g*, by which they are operated by the feet of the performer.

The purpose and effect of the thin elastic sounding board, forming one side of the long, broad, and shallow wind chest in which the reeds are located, is to produce a fuller, richer, and sweeter tone than has hitherto been obtained by any known mode of constructing reed musical instruments; another most useful effect of the broad thin elastic sounding board, is to prevent the vibration of the longer reeds from producing violent pulsations of air in the wind chest, which in reed instruments constructed after the old manner, it is found prevents the free vibration of the shorter and more sensitive reeds, and nearly drowns their tones when the longer and shorter reeds are simultaneously sounded; whereas, in our improved instrument, it is found that the tones produced by one of the shortest and most sensitive reeds, is as clear, distinct, and perfect when sounded in unison with one of the longest reeds, as it is when sounded by itself; and as perfect and distinct as the tone produced by the longer reed sounded in unison with it.

High or low tones are produced by the performer in the usual manner by touching different keys; but a loud or a soft tone is effected by a greater or less pressure upon one of the pedals *g*.

The reeds (*m*,) are secured to the under side of the block—or series of joined blocks or pieces—of wood A, in which the sounding cells *k*, are formed, in such a manner that each reed can be tuned.

The block A, is hinged to the bar D, which is confined to the upper side of the rear edge of the board E, and fits in air tight between the said bar D, and the bar G, rising from the back edge of the wind chest.

The series of keys *b, b'*, are located upon and within a movable frame composed of the transverse bars P, (Fig. 4) placed near each end of the board E, (that forms the top of the wind chest,) and which are connected together by the longitudinal bars Q, R, and T. The central bar R, forms the fulcrum of the keys, which are kept in their places by the vertical guiding pins $t$, and $v$, rising from the bars Q and R, into apertures in the keys; the rear ends of the keys pass into a recess formed in the bar T, and the cushions on their under sides are pressed down upon the openings in the tops of the air cells ($k$), by the springs $n$, as represented in Fig. 3. The rear extremities of the end bars P, of the key frame, are hinged to the bar G, forming the rear edge of the wind chest. By elevating the key frame, the block A, can be elevated for the purpose of replacing, repairing, or tuning the reeds $m$.

Brackets $z$, $z$, (Fig. 3) are secured to each end of the case of the instrument, for the reception of the lugs $x$, $x$, (Fig. 4) projecting from the corners of the wind chest.

In constructing our melo-peans, we shall generally place some of the parts in a reversed position to that represented in the accompanying drawings, to wit: we shall place the unelastic board or plank E, and the block A, at the bottom of the wind chest (B,) and form the top of the wind chest of the elastic sounding board $c$. When thus arranged, we shall connect the elastic sounding board to the wind chest by hinges, to enable it to be raised so as to get free access to the reeds; the keys will also require to be jointed, to enable them to open and close the openings into the cells $k$, when placed on the under side of the wind chest. This arrangement does not in the least deviate from the principles upon which our improvements are founded, as we do not intend to limit ourselves to any precise mechanical arrangement and proportion of parts.

What we claim as our invention and desire to secure by Letters Patent, is—

The converting the wind chest (B) in which the reeds $m$, are located, into an expansible sounding chamber by forming one side of it (the said wind chest) of a thin elastic sounding board ($c$) placed in sufficiently near proximity to the reeds, when this arrangement is combined with the location of the valves on the outside of the wind chest or sounding chamber, substantially in the manner and for the purpose herein set forth.

The above specification signed and witnessed this 23rd day of May, 1849.

B. T. BLODGET.
H. B. HORTON.

Witnesses:
Z. C. ROBBINS,
R. WILCOX.